(12) United States Patent
Beon et al.

(10) Patent No.: US 11,686,970 B2
(45) Date of Patent: Jun. 27, 2023

(54) DISPLAY DEVICE

(71) Applicant: Samsung Display Co., Ltd., Yongin-si (KR)

(72) Inventors: Beong-Hun Beon, Hwaseong-si (KR); Minha Kim, Hwaseong-si (KR); Dukjin Lee, Suwon-si (KR); Woosuk Jung, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/302,299

(22) Filed: Apr. 29, 2021

(65) Prior Publication Data

US 2022/0011631 A1 Jan. 13, 2022

(30) Foreign Application Priority Data

Jul. 8, 2020 (KR) .................. 10-2020-0083918

(51) Int. Cl.
*G02F 1/1335* (2006.01)
*G09F 9/30* (2006.01)
*G02F 1/1333* (2006.01)
*G02F 1/13363* (2006.01)

(52) U.S. Cl.
CPC .... *G02F 1/133528* (2013.01); *G02F 1/13338* (2013.01); *G02F 1/13363* (2013.01); *G09F 9/301* (2013.01)

(58) Field of Classification Search
CPC ............ G02F 2202/28; G02F 1/13338; G02F 1/13363; G02F 1/133528; G09F 9/301
See application file for complete search history.

(56) References Cited

U.S. PATENT DOCUMENTS

| | | | |
|---|---|---|---|
| 8,004,186 B2 | 8/2011 | Kim et al. | |
| 8,212,452 B2 | 7/2012 | Yeh et al. | |
| 8,344,396 B2 | 1/2013 | Shim et al. | |
| 8,963,413 B2 | 2/2015 | Fischer et al. | |
| 9,648,751 B2 | 5/2017 | Depres et al. | |
| 10,198,038 B2 | 2/2019 | Jang et al. | |
| 10,276,813 B2 | 4/2019 | Myung et al. | |
| 2008/0310019 A1 | 12/2008 | Um et al. | |
| 2010/0038023 A1* | 2/2010 | Kho | C09J 183/04 156/247 |
| 2010/0328053 A1 | 12/2010 | Yeh et al. | |

(Continued)

FOREIGN PATENT DOCUMENTS

| JP | 4975795 B2 | 7/2012 |
|---|---|---|
| JP | 5885081 B2 | 3/2016 |

(Continued)

*Primary Examiner* — Mariam Qureshi
(74) *Attorney, Agent, or Firm* — Lewis Roca Rothgerber Christie LLP

(57) ABSTRACT

Provided is a display device including a display panel, a polarizing layer on the display panel and including a linear polarizer having a stretched polymer film, an adhesive member directly on the linear polarizer, and a window on the adhesive member, wherein the adhesive member absorbs 90% or greater of light having a wavelength in a range of about 300 nm to about 380 nm, and may thus effectively protect the polarizing layer from ultraviolet light incident from the outside. In addition, the display device may obtain thinner thickness, thereby exhibiting excellent reliability.

20 Claims, 12 Drawing Sheets

(56) References Cited

U.S. PATENT DOCUMENTS

| | | | |
|---|---|---|---|
| 2011/0043077 A1 | 2/2011 | Yeh et al. | |
| 2011/0217530 A1 | 9/2011 | Maier-Richter et al. | |
| 2012/0146489 A1 | 6/2012 | Fischer et al. | |
| 2013/0105203 A1 | 5/2013 | Lee et al. | |
| 2013/0188324 A1 | 7/2013 | Lee et al. | |
| 2014/0308616 A1 | 10/2014 | Yang et al. | |
| 2015/0064461 A1* | 3/2015 | Kim | C09J 133/06 428/355 EP |
| 2015/0218394 A1 | 8/2015 | Kim et al. | |
| 2017/0199619 A1* | 7/2017 | Lee | G06F 3/0412 |
| 2017/0317316 A1 | 11/2017 | Yang et al. | |
| 2018/0149785 A1* | 5/2018 | Lee | G02F 1/133528 |
| 2019/0086709 A1* | 3/2019 | Lee | G02F 1/133528 |
| 2019/0163304 A1* | 5/2019 | Shim | G06F 3/0412 |

FOREIGN PATENT DOCUMENTS

| | | |
|---|---|---|
| JP | 5899220 B2 | 4/2016 |
| JP | 6378093 B2 | 8/2018 |
| JP | 2020-3650 A | 1/2020 |
| KR | 20-0368470 Y1 | 11/2004 |
| KR | 10-2005-0120136 A | 12/2005 |
| KR | 10-2008-0110090 A | 12/2008 |
| KR | 10-0996374 B1 | 11/2010 |
| KR | 10-2011-0048588 A | 5/2011 |
| KR | 10-1063361 B1 | 9/2011 |
| KR | 10-1065951 B1 | 9/2011 |
| KR | 10-2012-0014732 A | 2/2012 |
| KR | 10-1117344 B1 | 3/2012 |
| KR | 10-1147988 B1 | 5/2012 |
| KR | 10-2012-0089471 A | 8/2012 |
| KR | 10-1262464 B1 | 5/2013 |
| KR | 10-1262551 B1 | 5/2013 |
| KR | 10-1271838 B1 | 6/2013 |
| KR | 10-1271864 B1 | 6/2013 |
| KR | 10-2014-0128332 A | 11/2014 |
| KR | 10-1471570 B1 | 12/2014 |
| KR | 10-1529778 B1 | 6/2015 |
| KR | 10-1560973 B1 | 10/2015 |
| KR | 10-1630032 B1 | 6/2016 |
| KR | 10-2016-0096898 A | 8/2016 |
| KR | 10-1713277 B1 | 3/2017 |
| KR | 10-2017-0063344 A | 6/2017 |
| KR | 10-2017-0064453 A | 6/2017 |
| KR | 10-2017-0070309 A | 6/2017 |
| KR | 10-2017-0124438 A | 11/2017 |
| KR | 10-2018-0062950 A | 6/2018 |
| KR | 10-1854498 B1 | 6/2018 |
| KR | 10-1868476 B1 | 6/2018 |
| KR | 10-2020-0021915 A | 3/2020 |
| KR | 10-2164118 B1 | 10/2020 |

\* cited by examiner

DISPLAY DEVICE

CROSS-REFERENCE TO RELATED APPLICATIONS

This application claims priority to and the benefit of Korean Patent Application No. 10-2020-0083918, filed on Jul. 8, 2020, the entire contents of which are hereby incorporated by reference.

BACKGROUND

1. Field

Embodiments of the present disclosure herein relate to a display device, and, for example, to a display device including an adhesive member on a polarizing layer and absorbing ultraviolet light.

2. Description of the Related Art

Various display devices employed in multimedia devices such as a television set, a mobile phone, a tablet computer, a navigation system, and a game console are being developed. These display devices each include a polarizing member mainly to enhance viewability. The polarizing member includes a polarizer, and a protective film formed on both sides of the polarizer in order to protect the polarizer.

Meanwhile, recently, display devices that are foldable, bendable, or rollable are being under development using a flexible display member that is bendable to enable ease of portability and increase user friendliness. Accordingly, respective members employed in display devices are required to be thinner in order to ensure reliability in a folding or bending operation.

SUMMARY

Embodiments of the present disclosure provide a display device including a thinned polarizing member.

Embodiments of the present disclosure also provide a display device including an adhesive member capable of preventing or reducing deterioration in optical properties.

An embodiment of the present disclosure provides a display device including a display panel, a polarizing layer on the display panel and including a linear polarizer having a stretched polymer film, an adhesive member directly on the linear polarizer, and a window on the adhesive member, wherein the adhesive member absorbs 90% or greater of light having a wavelength in a range of about 300 nm to about 380 nm.

The adhesive member may include an elastomer adhesive resin and an ultraviolet absorber.

The adhesive member may have a peel force in a range of about 2000 g/25 nm to about 5000 g/25 nm, wherein the peel force may be measured in accordance with KS A 1107.

The adhesive member may have a thickness in a range of about 50 μm to about 200 μm.

The polarizing layer may further include a phase retardation layer on the display panel, and an optical adhesive layer between the phase retardation layer and the linear polarizer.

The polarizing layer may further include a first phase retardation layer on the display panel and a second phase retardation layer on the first phase retardation layer, wherein the first phase retardation layer may be a $\lambda/4$ phase retardation layer and the second phase retardation layer may be a $\lambda/2$ phase retardation layer.

The ultraviolet absorber may comprise at least one selected from among a benzotriazole-based monomer, a triphenyltriazine-based monomer, and a benzophenone-based monomer.

The ultraviolet absorber may be included in an amount in a range of about 0.5 to about 10 parts by weight with respect to the total parts by weight.

The adhesive member may further include an ultraviolet active crosslinking agent.

The adhesive member may include a first adhesive layer on the polarizing layer, a core layer on the first adhesive layer, and a second adhesive layer on the core layer, wherein at least one selected from the first adhesive layer and the second adhesive layer may absorb 90% or greater of light having a wavelength in a range of about 300 nm to about 380 nm.

The first adhesive layer may be in contact with the window, and the first adhesive layer may absorb 90% or greater of light having a wavelength in a range of about 300 nm to about 380 nm.

The display device may further include a touch sensing unit between the display panel and the polarizing layer.

The display panel may include a display element layer and an encapsulation layer on the display element layer, wherein the touch sensing unit may be directly on the encapsulation layer.

The display device may include at least one folding region, wherein the folding region may have a radius of curvature of about 5 mm or less.

In an embodiment of the present disclosure, a display device includes a display panel including a bending region deformable into a bent shape or having a bent shape with respect to a bending axis extending in one direction, a polarizing layer on the display panel and including a linear polarizer having a stretched polymer film, an adhesive member directly on the linear polarizer, and a window on the adhesive member, wherein the adhesive member absorbs 90% or greater of light having a wavelength in a range of about 300 nm to about 380 nm.

The adhesive member may have a peel force in a range of about 2000 g/25 nm to about 5000 g/25 nm, wherein the peel force may be measured in accordance with KS A 1107.

The polarizing layer may further include a phase retardation layer on the display panel, and an optical adhesive layer between the phase retardation layer and the linear polarizer.

In an embodiment of the present disclosure, a display device includes a display panel, a polarizing layer on the display panel and including a linear polarizer having a stretched polymer film, a first adhesive layer directly on the linear polarizer, a core layer on the first adhesive layer, a second adhesive layer on the core layer, and a window on the second adhesive layer.

At least any one selected from the first adhesive layer and the second adhesive layer may absorb 90% or greater of light having a wavelength in a range of about 300 nm to about 380 nm.

The first adhesive layer and the second adhesive layer each may have a thickness in a range of about 20 μm to about 100 μm.

BRIEF DESCRIPTION OF THE DRAWINGS

The accompanying drawings are included to provide a further understanding of the subject matter of the present disclosure, and are incorporated in and constitute a part of this specification. The drawings illustrate embodiments of the present disclosure and, together with the description, serve to explain principles of the subject matter of the present disclosure. In the drawings.

DETAILED DESCRIPTION

Figure 1:
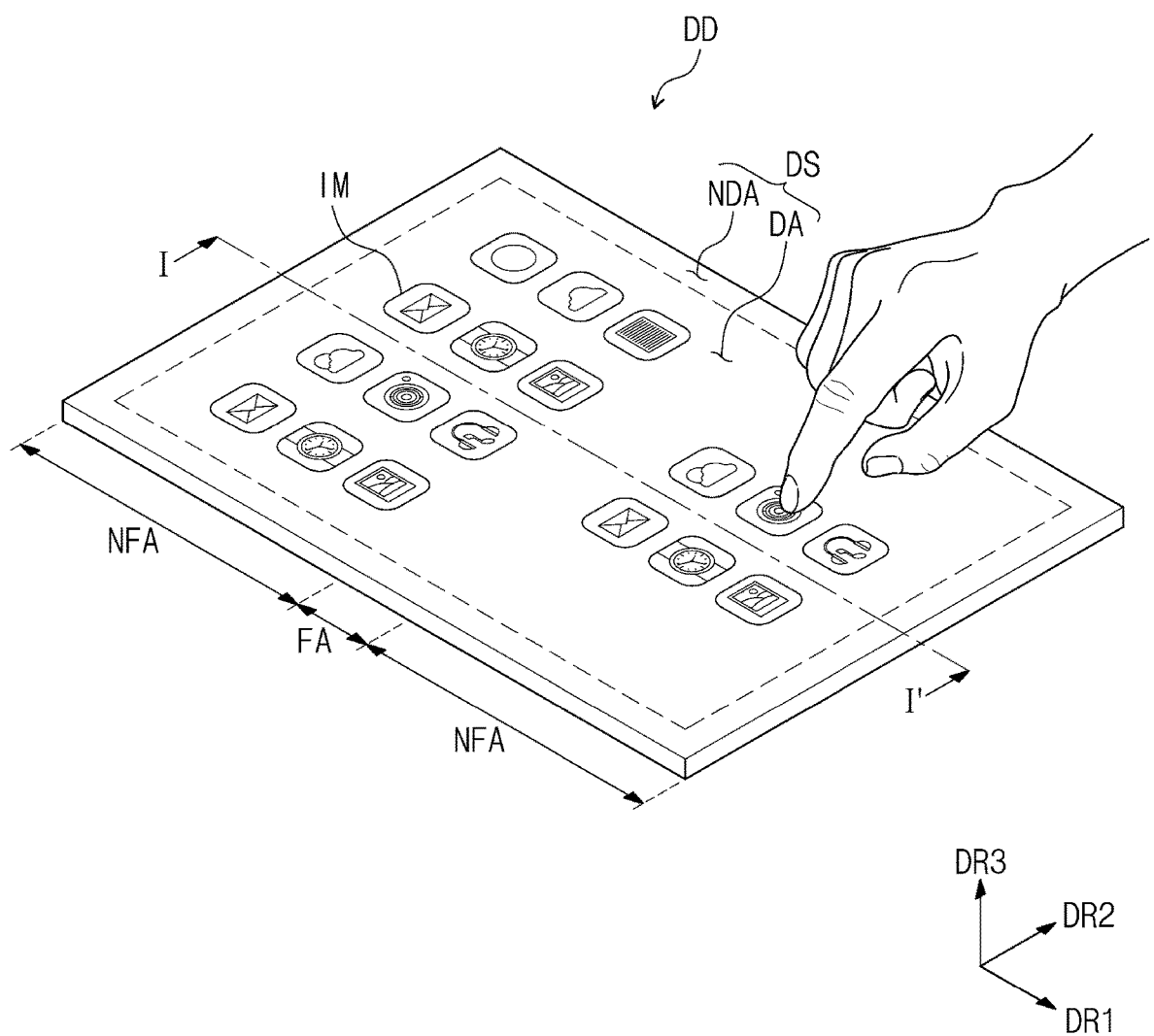
FIG. 1 is a perspective view of a display device of an embodiment.

The subject matter of the present disclosure may be modified in many alternate forms, and thus example embodiments will be exemplified in the drawings and described in more detail. It should be understood, however, that it is not intended to limit the present disclosure to the particular forms disclosed, but rather, is intended to cover all modifications, equivalents, and alternatives falling within the spirit and technical scope of the present disclosure.

In the present description, when an element (or a region, a layer, a portion, etc.) is referred to as being "on," "connected to," or "coupled to" another element, it can be directly on, connected or coupled to the other element or layer or intervening elements or layers may be present.

In the present description, "directly on" means that there is no intervening elements or layer, film, region, plate or the like added between a portion of a layer, a film, a region, a plate or the like and other portions. For example, "directly on" may mean on without additional members such as an adhesive member between two layers or two members.

Like numbers refer to like elements throughout. The thickness and the ratio and the dimension of the element may be exaggerated for effective description of the technical contents.

As used herein, the term "and/or," includes any and all combinations of one or more of which associated configurations may define.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the spirit and scope of example embodiments of the present disclosure.

The terminology used herein is for the purpose of describing particular embodiments only and is not intended to be limiting of the present disclosure. As used herein, the singular forms, "a", "an," and "the" are intended to include the plural forms as well, unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings. The term "on" in the present disclosure may indicate the case where any one member is on a lower part as well as on an upper part.

It will be further understood that the terms "includes" and/or "including," "comprise," or "have" when used in this specification, specify the presence of stated features, integers, active acts, operations, elements, and/or components, but do not preclude the presence or addition of one or more other features, integers, active acts, operations, elements, components, and/or groups thereof. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a resin composition, an adhesive member, and a display device according to an embodiment of the present disclosure will be described with reference to the accompanying drawings.

Figure 2:
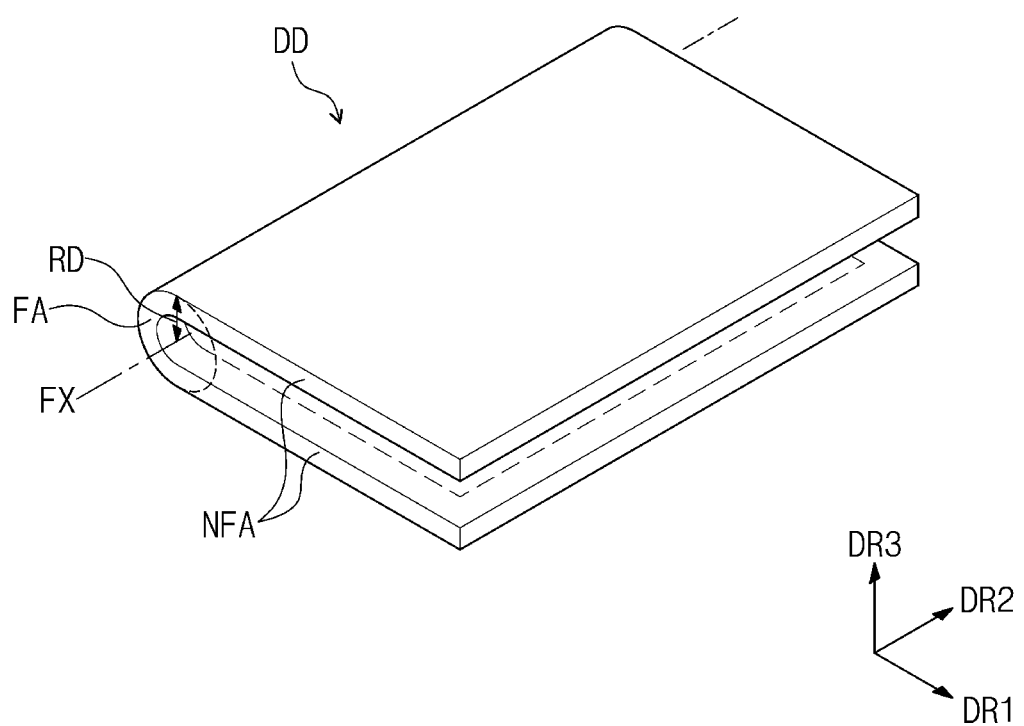
FIG. 2 is a view illustrating the display device of FIG. 1 in a folded state.

FIG. 1 is a perspective view of a display device according to an embodiment. FIG. 2 is a view illustrating the display device of FIG. 1 in a folded state.

Referring to FIG. 1, a display device DD of an embodiment may have a rectangular shape which has long sides extending in a first directional axis DR1 direction and short sides extending in a second directional axis DR2 direction which crosses the first directional axis DR1. However, embodiments of the present disclosure are not limited thereto. The display device DD may have various suitable shapes such as circular and polygonal shapes. The display device DD may be a flexible display device.

In the display device DD according to an embodiment, a display surface DS on which an image IM is displayed may be parallel (e.g., substantially parallel) to a plane defined by the first directional axis DR1 and the second directional axis DR2. The normal direction of the display surface DS, for example, the thickness direction of the display device DD is indicated by a third directional axis DR3. A front surface (or an upper surface) and a rear surface (or a lower surface) of each member may be defined by the third directional axis DR3. However, the directions indicated by the first to third directional axes DR1, DR2, and DR3 are relative concepts, and may thus be changed to other directions. Hereinafter, first to third directions correspond to directions indicated by the first to third directional axes DR1, DR2, and DR3, respectively, and are given like reference numerals.

The display device DD of an embodiment may include at least one folding region FA. Referring to FIGS. 1 and 2, the display device DD may include the folding region FA and a plurality of non-folding regions NFA. The folding region FA may be between the non-folding regions NFA, and the folding region FA and the non-folding regions NFA may be arranged adjacent to one another in the first directional axis DR1 direction.

The folding region FA may be a portion deformable into a shape which is folded with respect to a folding axis FX extending in one direction, which is the second directional axis DR2 direction. The folding region FA may have a radius of curvature RD of about 5 mm or less.

FIGS. 1 and 2 exemplarily illustrate one folding region FA and two non-folding regions NFA. However, the number of the folding region FA and the non-folding regions NFA is not limited thereto. For example, the display device DD may include a plurality of non-folding regions NFA the number of which is more than two, and a plurality of folding regions FA between the non-folding regions NFA.

In the display device DD of an embodiment, the non-folding regions NFA may be symmetrical to each other with respect to the folding region FA. However, embodiments of the present disclosure are not limited thereto, and the folding region FA may be between the non-folding regions NFA, but the areas of two non-folding regions NFA facing each other with respect to the folding region FA may be different.

The display surface DS of the display device DD may include a display region DA and a non-display region NDA around the display region DA. The display region DA may display an image, and the non-display region NDA may not display an image. The non-display region NDA may surround the display region DA and define the edge of the display device DD.

Referring to FIG. 2, the display device DD may be a foldable display device DD which is folded or unfolded. For example, the folding region FA may be bent along the folding axis FX which is parallel (e.g., substantially parallel) to the second directional axis DR2, and the display device DD may thus be folded. The folding axis FX may be defined as a minor axis parallel (e.g., substantially parallel) to the short sides of the display device DD.

When the display device DD is folded, the non-folding regions NFA may face each other, and the display device DD may be in-folded such that the display surface DS is not exposed to the outside. However, embodiments of the present disclosure are not limited thereto. Unlike the one illustrated in the drawing, the display device DD may be out-folded such that the display surface DS is exposed to the outside.

Figure 3:
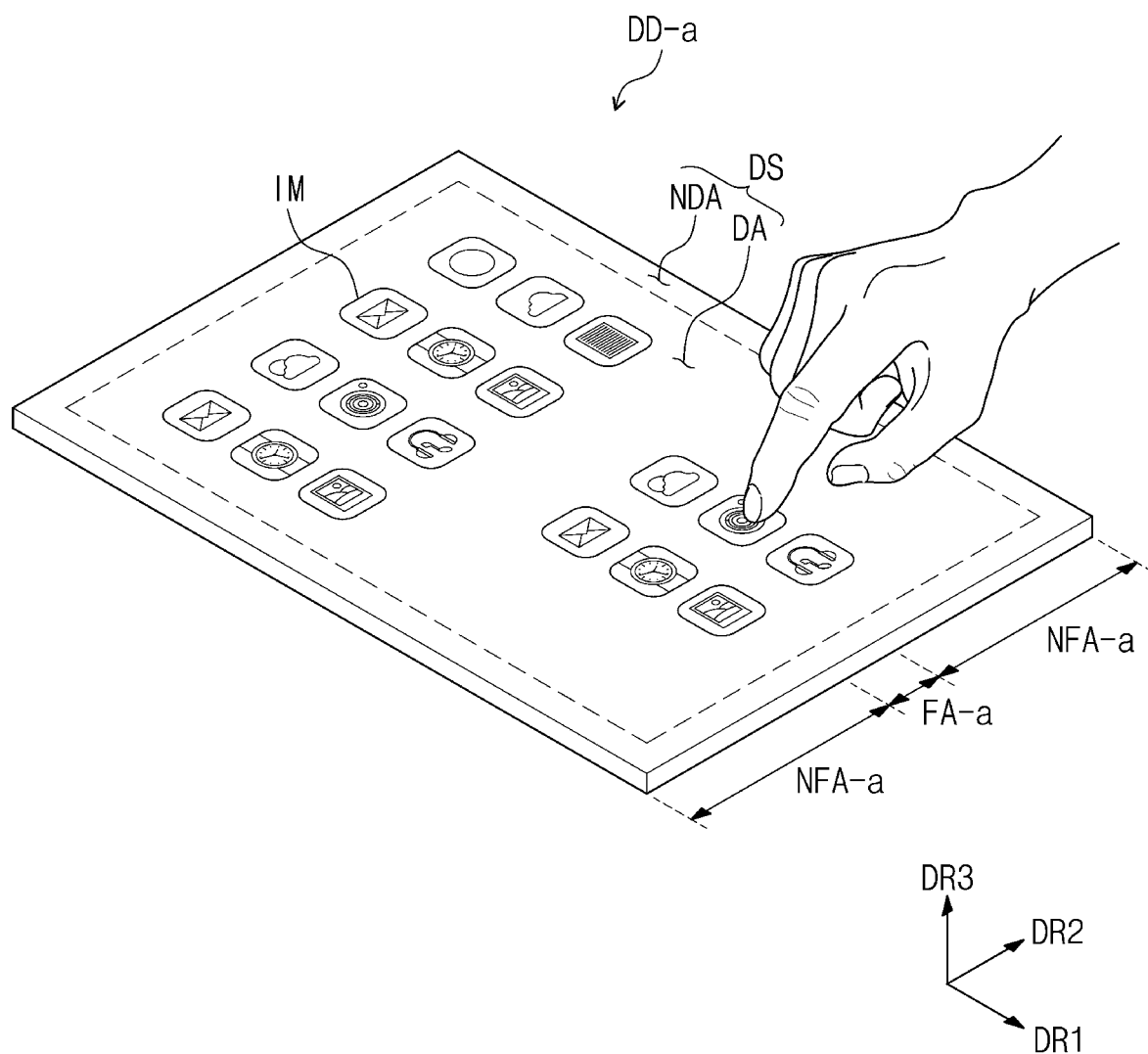
FIG. 3 is a perspective view of a display device of an embodiment.
Figure 4:
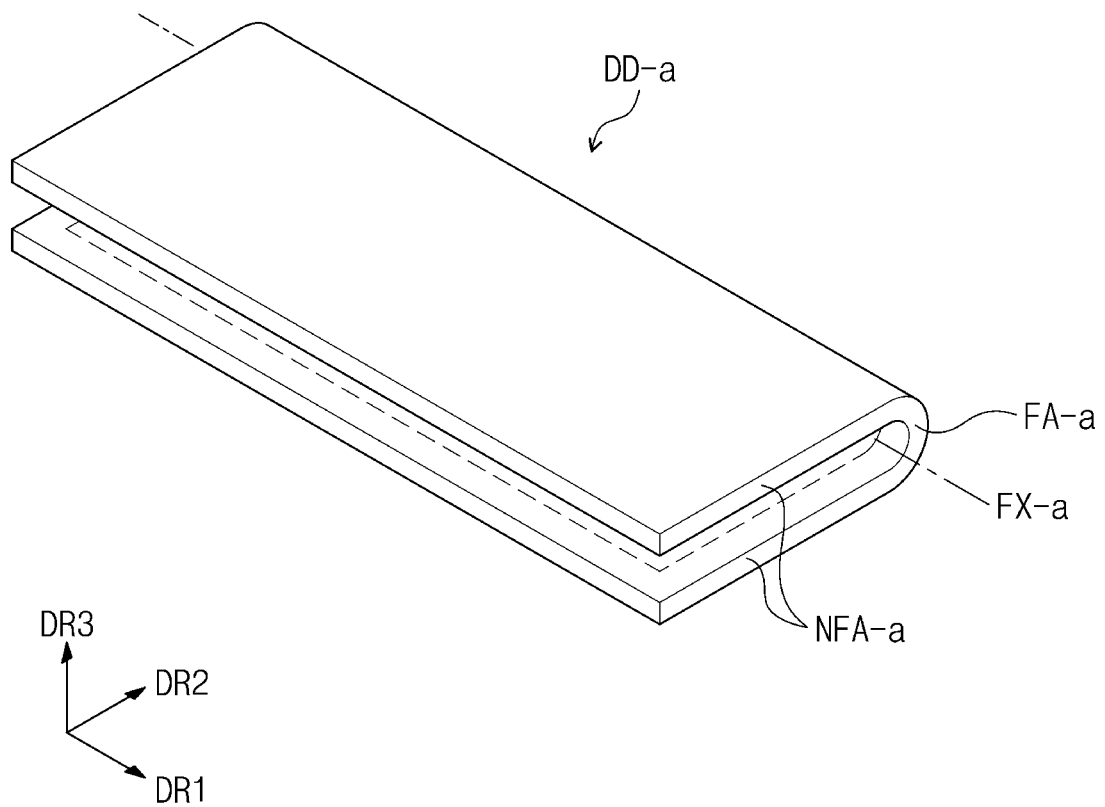
FIG. 4 is a view illustrating the display device of FIG. 3 in a folded state.

FIG. 3 is a perspective view of a display device according to an embodiment. FIG. 4 is a view illustrating the display device of FIG. 3 in a folded state.

Except for the folding operation, a display device DD-a illustrated in FIG. 3 may substantially have an identical configuration to the display device DD illustrated in FIG. 1. Accordingly, for descriptions on the display device DD-a illustrated in FIGS. 3 and 4, the folding operation will be mainly described.

Referring to FIGS. 3 and 4, the display device DD-a may include a folding region FA-a and a plurality of non-folding regions NFA-a. The folding region FA-a may be between the non-folding regions NFA-a, and the folding region FA-a and the non-folding regions NFA-a may be arranged adjacent to one another in the second directional axis DR2 direction.

The folding region FA-a is bent with respect to a folding axis FX-a which is parallel (e.g., substantially parallel) to the first directional axis DR1, and the display device DD-a may thus be folded. The folding axis FX-a may be defined as a major axis parallel (e.g., substantially parallel) to the long sides of the display device DD-a. The display device DD illustrated in FIG. 1 may be folded with respect to the minor axis, whereas the display device DD-a illustrated in FIG. 3 may be folded with respect to the major axis. FIG. 4 illustrates that the display device DD-a is in-folded such that the display surface DS is not exposed to the outside, but embodiments of the present disclosure are not limited thereto, and the display device DD-a may be folded with respect to the major axis and out-folded (e.g., such that the display surface DS is exposed to the outside).

Figure 5:
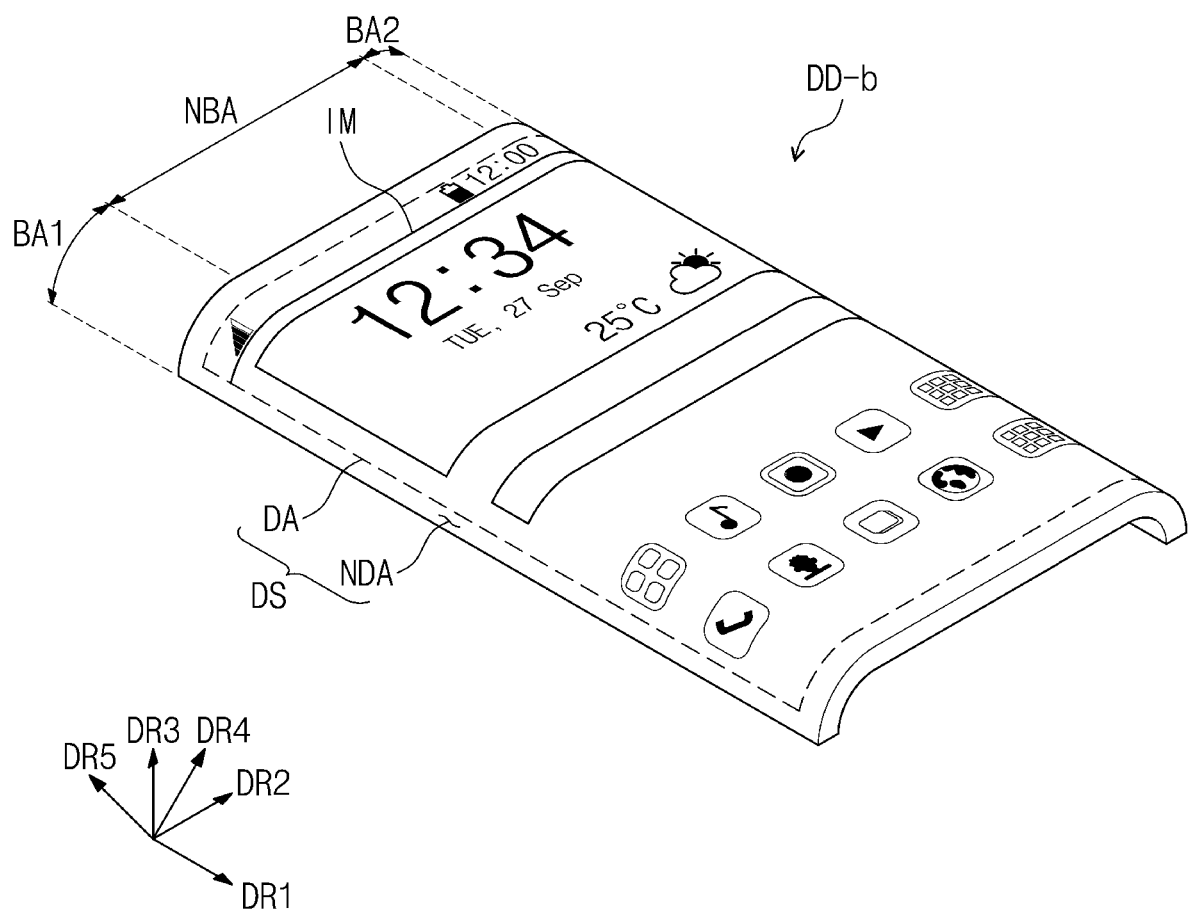
FIG. 5 is a perspective view of a display device of an embodiment.

FIG. 5 is a perspective view of a display device according to an embodiment. A display device DD-b of an embodiment may include bending regions BA1 and BA2 and a non-bending region NBA, and the bending regions BA1 and BA2 may be bent from one side of the non-bending region NBA.

Referring to FIG. 5, the display device DD-b of an embodiment may include the non-bending region NBA to display an image IM on a front surface, and the first bending region BA1 and the second bending region BA2 to display an image IM on a side surface. The first bending region BA1 and the second bending region BA2 each may be bent from both sides of the non-bending region NBA.

Referring to FIG. 5, the non-bending region NBA may provide an image IM in a direction of the third directional axis DR3 which is the front surface of the display device DD-b, and the first bending region BA1 and the second bending region BA2 may provide images in directions of a fifth directional axis DR5 and a fourth directional axis DR4, respectively. The fourth directional axis DR4 and the fifth directional axis DR5 may be crossing the first to third directional axes DR1, DR2, and DR3. However, the directions indicated by the first to fifth directional axes DR1 to DR5 are relative concepts, and are not limited to the directional relationship illustrated in the drawings.

The display device DD-b of an embodiment may be a bending display device including a non-bending region NBA, and bending regions BA1 and BA2 each on both sides of the non-bending region NBA. In addition, the display device of an embodiment may be a bending display device including one non-bending region and one bending region. In this case, the bending region may be bent only at one side of the non-bending region and provided.

FIGS. 1 to 5 described above illustrate a foldable display device, a bending display device, etc., but embodiments of the present disclosure are not limited thereto. The display device of an embodiment may be a rollable display device, a flat rigid display device, or a curved rigid display device.

Hereinafter, a display device of an embodiment will be described based on the display device DD which is folded with respect to the minor axis, but embodiments of the present disclosure are not limited thereto, and the following descriptions may be applied to various suitable types or kinds of display devices in addition to the display device DD-a which is folded with respect to the major axis and the display device DD-b including a bending region.

Figure 6:
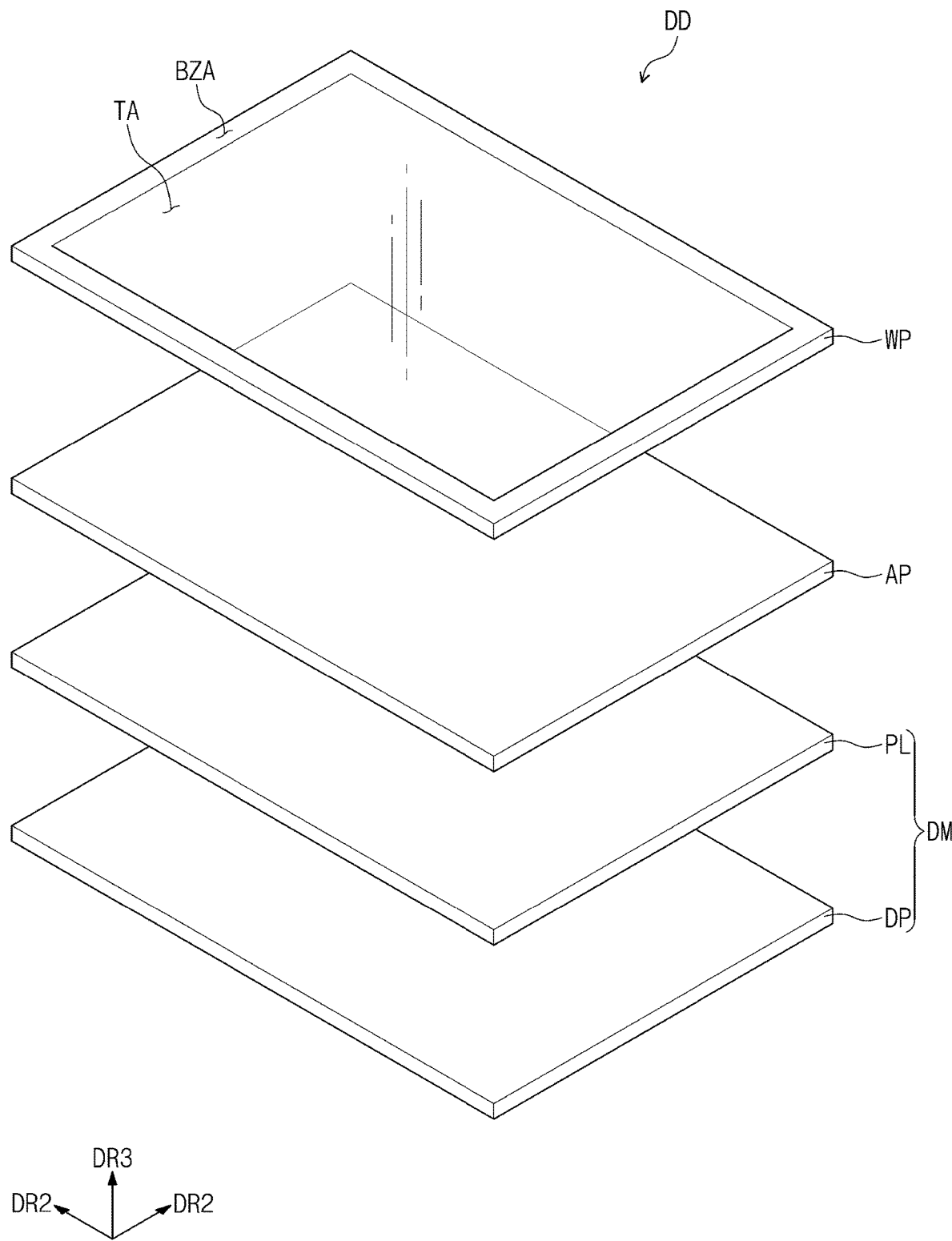
FIG. 6 is an exploded perspective view of a display device of an embodiment.
Figure 7:
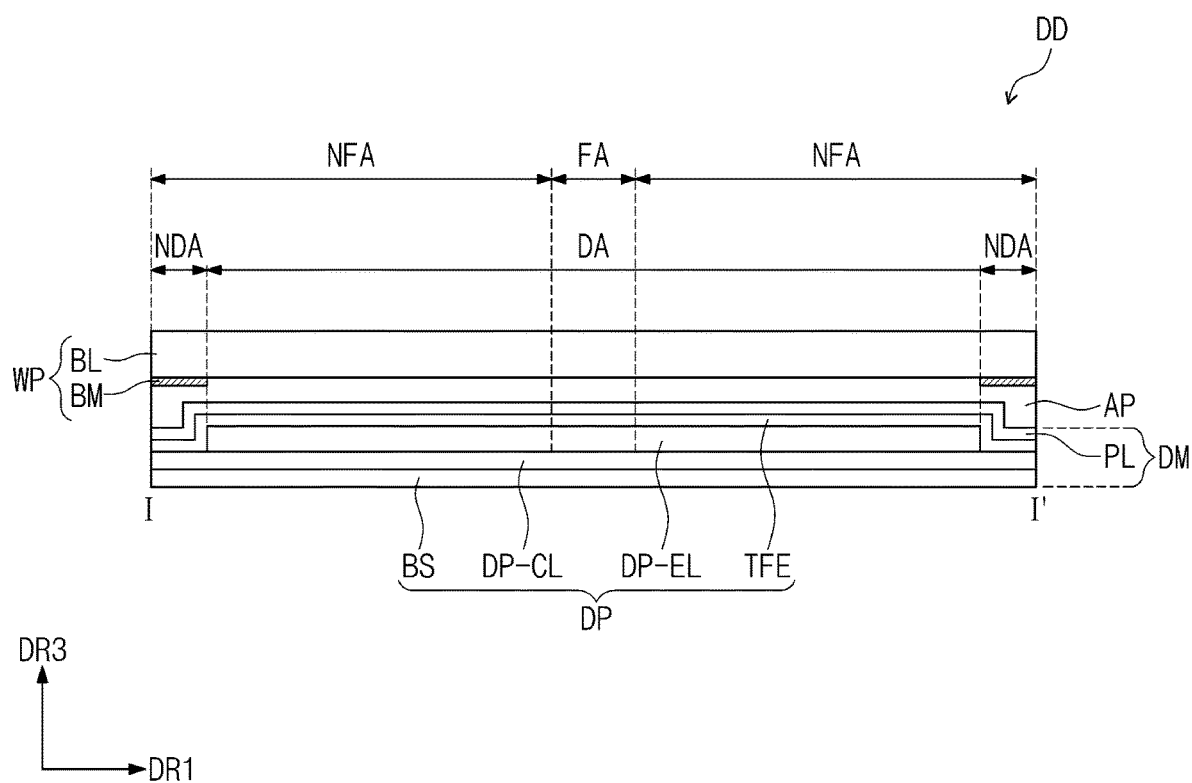
FIG. 7 is a cross-sectional view of a display device of an embodiment.

FIG. 6 is an exploded perspective view of a display device DD of an embodiment. FIG. 7 is a cross-sectional view of a display device DD of an embodiment. FIG. 7 is a cross-sectional view of a portion corresponding to line I-I' of FIG. 1.

The display device DD of an embodiment includes a display module DM, and a window WP on the display module DM. In the display device DD of an embodiment, the display module DM includes a display panel DP having a display element layer DP-EL, and a polarizing layer PL on the display panel DP.

The display device DD of an embodiment includes an adhesive member AP between the display module DM and the window WP. For example, in the display device DD of an embodiment, the adhesive member AP may be between the polarizing layer PL and the window WP. The adhesive member AP may be an optically clear adhesive film (OCA) and/or an optically clear adhesive resin layer (OCR).

Referring to FIG. 7, the display panel DP may include a base substrate BS, a circuit layer DP-CL on the base substrate BS, a display element layer DP-EL on the circuit layer DP-CL, and an encapsulation layer TFE covering the display element layer DP-EL. For example, the display panel DP may include a plurality of organic light emitting elements and/or a plurality of quantum dot light emitting elements in the display element layer DP-EL.

The configuration of the display panel DP presented in FIG. 7 is an example, and the configuration of the display panel DP is not limited to the one illustrated in FIG. 7. For example, the display panel DP may include a liquid crystal display element, and in some embodiments of this case, the encapsulation layer TFE may be omitted.

Figure 8A:
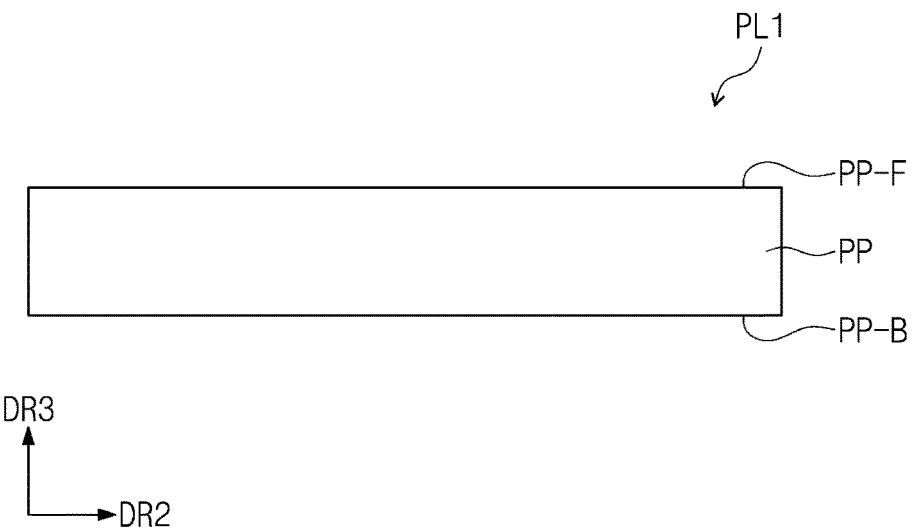
FIGS. 8A to 8D are cross-sectional views of a polarizing layer of an embodiment.

The polarizing layer PL may be on the display panel DP. The polarizing layer PL includes a linear polarizer PP (FIG. 8A). The linear polarizer PP (FIG. 8A) may be a film-type (or film kind of) polarizer including a stretched polymer film. The polarizing layer PL may be on the display panel DP to control reflected light from the display panel DP due to external light.

The window WP may protect the display module DM. An image IM generated in the display module DM may pass through the window WP to be provided or displayed to a user. The window WP may provide a touch surface of the display device DD. In the display device DD including a folding region FA, the window WP may be a flexible window.

The window WP may include a base layer BL and a printing layer BM. The window WP may include a transmission region TA and a bezel region BZA. A front surface of the window WP including the transmission region TA and the bezel region BZA corresponds to a front surface of the display device DD.

The transmission region TA may be an optically transparent region. The bezel region BZA may be a region having relatively lower light transmittance than the transmission region TA. The bezel region BZA may have a set or predetermined color. The bezel region BZA may be adjacent to the transmission region TA and may surround the transmission region TA. The bezel region BZA may define the shape of the transmission region TA. However, embodiments of the present disclosure are not limited to the one illustrated, and the bezel region BZA may be adjacent to only one side of the transmission region TA, and a part thereof may be omitted.

The base layer BL may be a glass and/or plastic substrate. For example, the base layer BL may be a tempered glass substrate. In some embodiments, the base layer BL may be include a flexible polymer resin. For example, the base layer BL may include a polyimide, polyacrylate, polymethylmethacrylate, polycarbonate, polyethylenenaphthalate, polyvinylidene chloride, polyvinylidene difluoride, polystyrene, an ethylene vinylalcohol copolymer, or a combination thereof. However, embodiments of the present disclosure are not limited thereto, and any suitable material generally used in the art may be used for the base layer BL of the window WP.

The printing layer BM may be on one surface of the base layer BL. In an embodiment, the printing layer BM may be provided on a lower surface of the base layer BL adjacent to the display module DM. The printing layer BM may be on an edge region of the base layer BL. The printing layer BM may be an ink printing layer. Further, the printing layer BM may be a layer formed by including a pigment and/or dye. In the window WP, the bezel region BZA may be a portion providing the printing layer BM.

In some embodiments, the window WP may further include at least one functional layer provided on the base layer BL. For example, the functional layer may be a hard coating layer, an anti-fingerprint coating layer, etc., but embodiments of the present disclosure are not limited thereto.

The adhesive member AP is between the display module DM and the window WP. The adhesive member AP may bond the display module DM and the window WP. For example, the adhesive member AP may bond the polarizing layer PL and the window WP. In addition, the adhesive member AP may serve to protect the polarizing layer PL.

The adhesive member AP of an embodiment includes an elastomer adhesive resin and an ultraviolet absorber. The elastomer adhesive resin may be a main component enabling adhesion of the adhesive member AP. The type or kind of the elastomer adhesive resin is not particularly limited as long as the type or kind has a set or certain level of peel force. For example, the elastomer adhesive resin may include an acrylic-based elastomer resin, a silicone-based elastomer resin, a rubber-based elastomer resin, and/or a urethane-based elastomer resin. The acrylic-based elastomer adhesive resin may include, for example, ethyl acrylate, butyl acrylate, ethylhexyl acrylate, methyl acrylate, propyl acrylate, methyl methacrylate, hydroxy acrylate, vinyl acetate acrylate, acrylonitrile, acrylic amide, styrene, acrylic acid, methacrylic acid, itaconic acid, dimethylaminoethyl acrylic acid, matyrol acrylamide, glycidyl methamide, maleic anhydride, etc. In addition, the elastomer adhesive resin may include two or more of the above components.

The adhesive member AP of an embodiment may have a peel force value in a range of about 2000 g/25 nm to about 5000 g/25 nm, as measured in accordance with KS A 1107. When the adhesive member AP has a peel force value of about 2000 g/25 nm or greater, the adhesive member AP may effectively bond the window WP and the polarizing layer PL.

In the adhesive member AP of an embodiment, an ultraviolet absorber may be used without limitation as long as the absorber absorbs light having a wavelength in a range of about 200 nm to about 400 nm. For example, the ultraviolet absorber may include one or more selected from among a phenol-based monomer, a benzotriazole-based monomer, a benzophenone-based monomer, an oxybenzophenone-based monomer, a cyanoacrylate-based monomer, a salicylic acid-based monomer, a triazine-based monomer, an oxamide-based monomer, and tinuvin (BASF SE). For example, the ultraviolet absorber may include any one selected from among a benzotriazole-based monomer, a salicylic acid ester-based monomer, a triphenyltriazine-based monomer, tinuvin, and a benzophenone-based monomer. The ultraviolet absorber may be included in an amount in a range of about 0.5 to about 10 parts by weight with respect to the total parts by weight of materials included in the adhesive member AP. The adhesive member AP of an embodiment may absorb ultraviolet light incident from the outside to effectively prevent the ultraviolet light from reaching the polarizing layer PL (or to reduce the amount of ultraviolet light that reaches the polarizing layer PL). The adhesive member AP, for example, may absorb 90% or greater of light having a wavelength in a range of about 300 nm to about 380 nm.

The adhesive member AP may further include a crosslinking agent. The crosslinking agent included in the adhesive member AP may be, for example, a melamine-based crosslinking agent, a urea-based crosslinking agent, an isocyanate-based crosslinking agent, an epoxy-based crosslinking agent, a metal chelate-based crosslinking agent, a metal salt crosslinking agent, a metal oxide crosslinking agent, a polyamine cinnamate-based crosslinking agent, etc. For example, the adhesive member AP may further include an ultraviolet active crosslinking agent. Examples of the ultraviolet active crosslinking agent may be, for example, irgacure, benzoin methyl ether, benzoin ethyl ether, benzoin isopropyl ether, lucirin TPO, etc. The adhesive member AP is photocurable, includes an ultraviolet active crosslinking agent, and may thus cause a sufficient or suitable crosslinking reaction.

The crosslinking agent may be included in an amount in a range of about 0.01 to about 20 parts by weight, about 0.5 to about 2.0 parts by weight, or, for example, about 1.0 to about 16.0 parts by weight, with respect to the total parts by weight. The adhesion and reliability of the adhesive member AP may be further improved in the range above.

The adhesive member AP of an embodiment may further include an additive. For example, the adhesive member AP may further include a silane coupling agent for increasing or improving adhesion. The silane coupling agent may be, for example, an epoxy group-containing silane coupling agent such as 3-glycidoxy propyltrimethoxysilane, 3-glycidoxy propyltriethoxysilane, 3-glycidoxy propyl methyldiethoxysilane, and/or 2-(3,4 epoxycyclohexyl) ethyltrimethoxysilane, an amino group-containing silane coupling agent such as 3-aminopropyltrimethoxysilane, N-2-(aminoethyl)-3-aminopropyl methyldimethoxysilane, 3-triethoxysilyl-N(1, 3-dimethylbutylidene) propylamine, and/or N-phenyl-γ-aminopropyltrimethoxysilane, a (meth) acrylic group-containing silane coupling agent such as 3-acryloxypropyl trimethoxysilane and/or 3-methacryloxypropyl triethoxysilane, an isocyanate group-containing silane coupling agent such as 3-isocyanate propyltriethoxysilane, etc. The silane coupling agent may be included in an amount in a range of about 1 part by weight or less, about 0.01 to about 1 part by weight, or, for example, about 0.02 to about 0.6 parts by weight.

The adhesive member AP may further include an antistatic agent to prevent static electricity from being generated (or to reduce the amount of static electricity that is generated). The antistatic agent may include, for example, an organic salt, a metal salt, and/or a tetravalent ammonium-based monomer.

In addition, the adhesive member AP may further include additives such as a reaction rate control agent, a curing accelerator, ionic liquid, a lithium salt, an inorganic filler, a softener, a molecular weight control agent, an antioxidant, an anti-aging agent, a stabilizer, a tackifier resin, a leveling agent, an antifoaming agent, a plasticizer, dye, a pigment (a coloring pigment, an extender pigment, etc.), a treatment agent, a sunscreen, an optical brightener, a dispersant, a thermal stabilizer, a light stabilizer, an antistatic agent, a flocculant, a lubricant, and/or a solvent.

In some embodiments, the adhesive member AP of an embodiment may be provided on one surface of the window WP and/or on one surface of the display module DM in the form of a liquid resin composition, and may be formed by ultraviolet-curing the liquid composition provided between the window WP and the display module DM. Unlike the one described above, the adhesive member AP may be formed and provided by ultraviolet-curing the liquid composition in a separate process, laminating one surface of the adhesive member AP cured in the form of an adhesive film on one surface of the window WP and/or one surface of the display module DM, and bonding one surface of the window WP and/or one surface of the display module DM, which is not bonded to the other surface of the adhesive member AP.

In an embodiment, the adhesive member AP may have a thickness in a range of about 50 μm to about 200 μm. For example, the adhesive member AP may have a thickness in a range of about 70 μm to about 150 μm. When the thickness of the adhesive member AP is less than about 50 μm, adhesion may not be sufficient or suitable.

Hereinafter, in descriptions of FIGS. 8A to 8D, the polarizing layer PL included in the display device DD of an embodiment described above will be elaborated. FIGS. 8A to 8D are views showing cross-sections of polarizing layers PL1, PL1-1, PL2, and PL3 of an embodiment.

Referring to FIG. 8A, the polarizing layer PL1 includes a linear polarizer PP. The linear polarizer PP may linearly polarize provided light in one direction. The linear polarizer PP may include an upper surface PP-F in direct contact (e.g., physical contact) with the adhesive member AP and a lower surface PP-B facing the upper surface PP-F. The polarizing layer PL1 of an embodiment may not include a separate protective layer. For example, a separate protective layer may not be included between the upper surface PP-F of the linear polarizer PP and the adhesive member AP. In addition, a separate protective layer may not be included between the lower surface PP-B of the linear polarizer PP and the display module DM. However, embodiments of the present disclosure are not limited thereto.

Figure 8B:
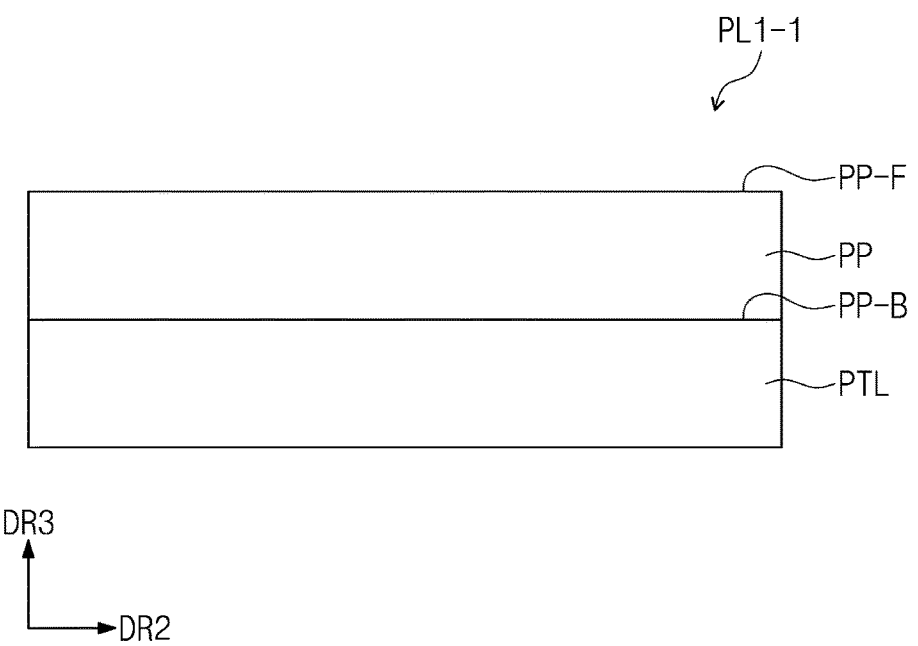

Referring to FIG. 8B, the polarizing layer PL1-1 may further include a protective layer PTL on the lower surface PP-B of the linear polarizer PP. However, even in this case, a separate protective layer may not be included between the upper surface PP-F of the linear polarizer PP and the adhesive member AP. The protective layer PTL may include, for example, a triacetyl cellulose (TAC) layer. In addition, embodiments of the present disclosure are not limited thereto, and the protective layer PTL may further include a hard coating layer, an anti-reflection layer, a phase retardation layer, and/or an anti-glare layer. However, embodiments of the present disclosure are not limited thereto, and the protective layer PTL may be on the upper surface PP-F of the linear polarizer PP.

The linear polarizer PP of an embodiment may be a film type (or film kind of) polarizer including a stretched polymer film. For example, the stretched polymer film may be a stretched polyvinylalcohol-based film. In this case, a direction in which the polymer film is stretched may be an absorption axis of the linear polarizer PP, and a direction perpendicular (e.g., substantially perpendicular) to the stretched direction may be a transmission axis of the linear polarizer PP. The linear polarizer PP may be manufactured by adsorbing a dichroic dye onto the stretched polymer film. For example, the linear polarizer PP may be manufactured by adsorbing iodine onto a stretched polyvinyl alcohol film.

In general, iodine adsorbed onto a polyvinyl alcohol film may be under a reaction as shown in Formula 1 below by ultraviolet light. For example, when ultraviolet light reaches the polarizing layer PL, iodine ions of the linear polarizer PP absorb the ultraviolet light and release heat, and the released heat deforms ionic species, and thus $I_2$ may be generated. Polyvinyl alcohol may react with the generated $I_2$, thereby causing polyenylation as shown in Formula 2 below. In some embodiments, polyvinyl alcohol may directly absorb incident ultraviolet light, thereby causing polyenylation due to radical formation of —OH. The linear polarizer PP subjected to polyenylation becomes incapable of serving an optical role.

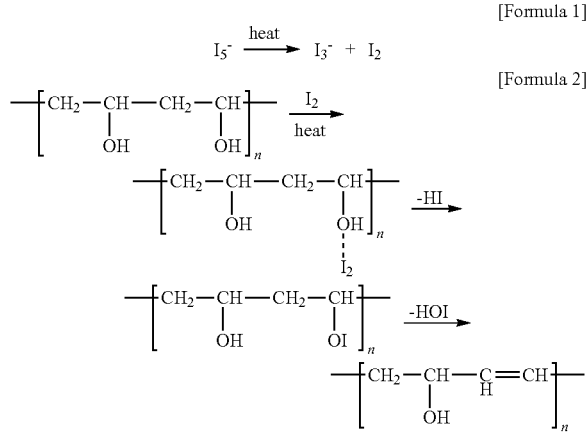

In order to prevent or reduce this phenomenon, a separate protective layer for the linear polarizer PP may be included, but in this case, the polarizing layer PL1 becomes thicker, and, for example, wrinkles or cracks may be caused in the polarizing layer PL1 under a folding and/or bending condition. Accordingly, in the display device DD of an embodiment, the inclusion of an ultraviolet absorber in the adhesive member AP in contact (e.g., physical contact) with the polarizing layer PL1 may effectively prevent ultraviolet light from reaching the polarizing layer PL1 (or may reduce the amount of ultraviolet light that reaches the polarizing layer PL1), the omission of a protective layer may make the display device DD thinner, and the display device DD may be more easily bent and/or folded.

In an embodiment, the linear polarizer PP may have a thickness in a range of about 1 μm to about 50 μm. For example, the linear polarizer PP may have a thickness in a range of about 3 μm to about 20 μm, or about 5 μm to about 15 μm. When the thickness of the linear polarizer PP is less than about 1 μm, optical properties may not be uniformly implemented, and when the thickness is greater than about 50 μm, benefits from reduction in thickness of the polarizing layer PL may not be sufficient or suitable.

Figure 8C:
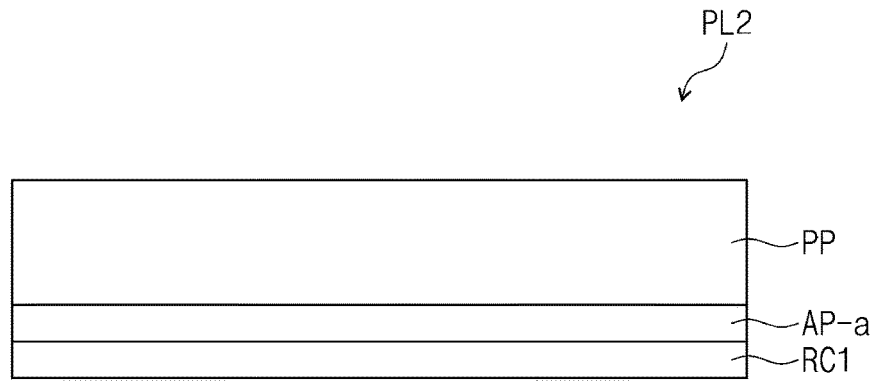
Figure 8C:
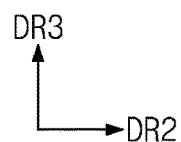

Referring to FIG. 8C, the polarizing layer PL2 may further include a first phase retardation layer RC1 on a lower surface of the linear polarizer PP. In an embodiment, the first phase retardation layer RC1 may be a λ/4 phase retardation layer (e.g., a quarter wavelength phase retardation layer) delaying the phase of provided light by λ/4 (e.g., that changes the phase of the provided light by a quarter wavelength). For example, when the wavelength of light transmitted through the linear polarizer PP and provided to the first phase retardation layer RC1 is about 550 nm, the light passing through the first phase retardation layer RC1 may have a phase retardation value of about 137.5 nm.

In addition, the first phase retardation layer RC1 may have optical anisotropy and change a polarization state of incident light. For example, the light transmitted through the linear polarizer PP and provided to the first phase retardation layer RC1 may be turned into a circularly polarized state from a linearly polarized state by the first phase retardation layer RC1. In addition, the light provided to the first phase retardation layer RC1 in a circularly polarized state may be turned into a linearly polarized state by the first phase retardation layer RC1.

In the polarizing layer PL2 of an embodiment, the first phase retardation layer RC1 may be a liquid crystal coating layer. The first phase retardation layer RC1 may be a liquid crystal coating layer formed using a reactive liquid crystal monomer. The first phase retardation layer RC1 may be prepared through processes of coating, aligning, and polymerizing the reactive liquid crystal monomer. For example, the liquid crystal monomer used in the first phase retardation layer RC1 may have a bar-type (or bar kind of) nematic phase. For example, the first phase retardation layer RC1 may be a nematic liquid crystal coating layer.

The first phase retardation layer RC1 may have a thickness in a range of about 0.5 μm to about 5 μm. For example, the first phase retardation layer may have a thickness in a range of about 0.5 μm to about 2 μm. When the thickness of the first phase retardation layer RC1 is less than about 0.5 μm, optical properties may not be uniformly implemented, and when the thickness is greater than about 5 μm, benefits from reduction in thickness of the polarizing layer PL may not be sufficient or suitable.

An optical adhesive member AP-a may be between the first phase retardation layer RC1 and the linear polarizer PP. The optical adhesive member AP-a may be an adhesive layer including at least one selected from among an acrylic-based resin, a silicone-based resin, a urethane-based resin, and an epoxy-based resin. The optical adhesive member AP-a may have a thickness in a range of about 0.1 μm to about 10 μm.

Figure 8D:
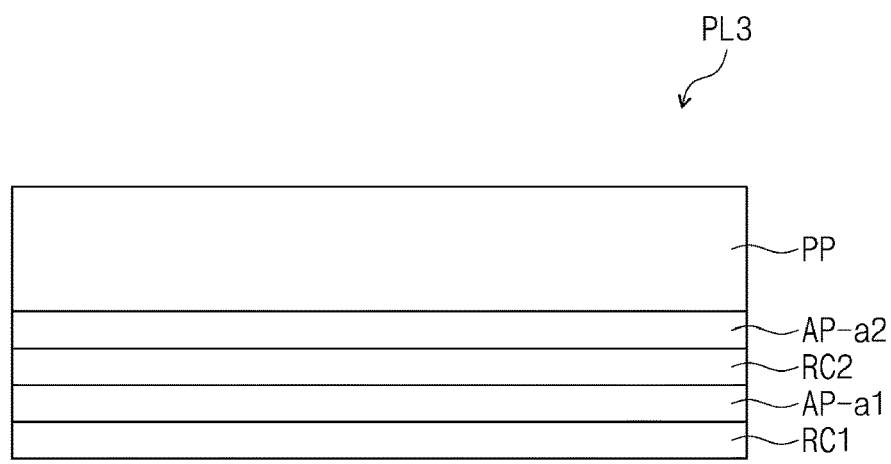
Figure 8D:
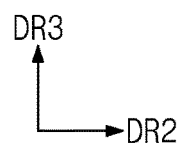

Referring to FIG. 8D, in an embodiment, a polarizing layer PL3 may further include a second phase retardation layer RC2 in addition to the first phase retardation layer RC1 and the linear polarizer PP. In an embodiment, the second phase retardation layer RC2 may be between the first phase retardation layer RC1 and the linear polarizer PP. In addition, a first optical adhesive member AP-a1 may be between the first phase retardation layer RC1 and the linear polarizer PP, and a second optical adhesive member AP-a2 may be further included between the second phase retardation layer RC2 and the first phase retardation layer RC1. The same descriptions as the one on the optical adhesive member AP-a described above may be applied to the first optical adhesive member AP-a1 and the second optical adhesive member AP-a2.

The second phase retardation layer RC2 may be an optical layer delaying the phase of provided light by λ/2 (e.g., a half wavelength optical layer that changes the phase of the provided by a half wavelength). For example, when the wavelength of light transmitted through the linear polarizer PP and provided to the second phase retardation layer RC2 is about 550 nm, the light passing through the second phase retardation layer RC2 may have a phase retardation value of about 275 nm.

In addition, the polarization state of light incident on the second phase retardation layer RC2 may be changed. The polarization direction of the linearly polarized light incident from the linear polarizer PP to the second phase retardation layer RC2 may be changed.

In some embodiments, any one selected from a phase retardation value in the thickness direction of the first phase retardation layer RC1 and a phase retardation value in the thickness direction of the second phase retardation layer RC2 may have a positive value, and the other one may have a negative value. For example, the first phase retardation layer RC1 may be a positive A-plate, and the second phase retardation layer RC2 may be a negative A-plate.

The second phase retardation layer RC2 may be a liquid crystal coating layer. The second phase retardation layer RC2 may be a liquid crystal coating layer formed using a reactive liquid crystal monomer. The second phase retardation layer RC2 may be prepared through processes of coating, aligning, and polymerizing the reactive liquid crystal monomer. For example, the liquid crystal monomer used in the second phase retardation layer RC2 may have a disc-type (or disc kind of) discotic phase. For example, the second phase retardation layer RC2 may be a discotic liquid crystal coating layer.

The second phase retardation layer RC2, which is a liquid crystal coating layer, may have a thickness in a range of about 0.5 µm to about 70 µm. For example, the second phase retardation layer RC2 may have a thickness in a range of about 5 µm to about 50 µm. In addition, the thickness of the second phase retardation layer RC2 may be the same as or different from the thickness of the first phase retardation layer RC1. For example, in some embodiments, the thickness of the second phase retardation layer RC2 may be greater than the thickness of the first phase retardation layer RC1.

When the thickness of the second phase retardation layer RC2 is less than about 0.5 µm, optical properties may not be uniformly implemented in the phase retardation layer, and when the thickness of the second phase retardation layer RC2 is greater than about 70 µm, benefits from reduction in thickness of the polarizing layer PL3 may not be sufficient or suitable.

Figure 9A:
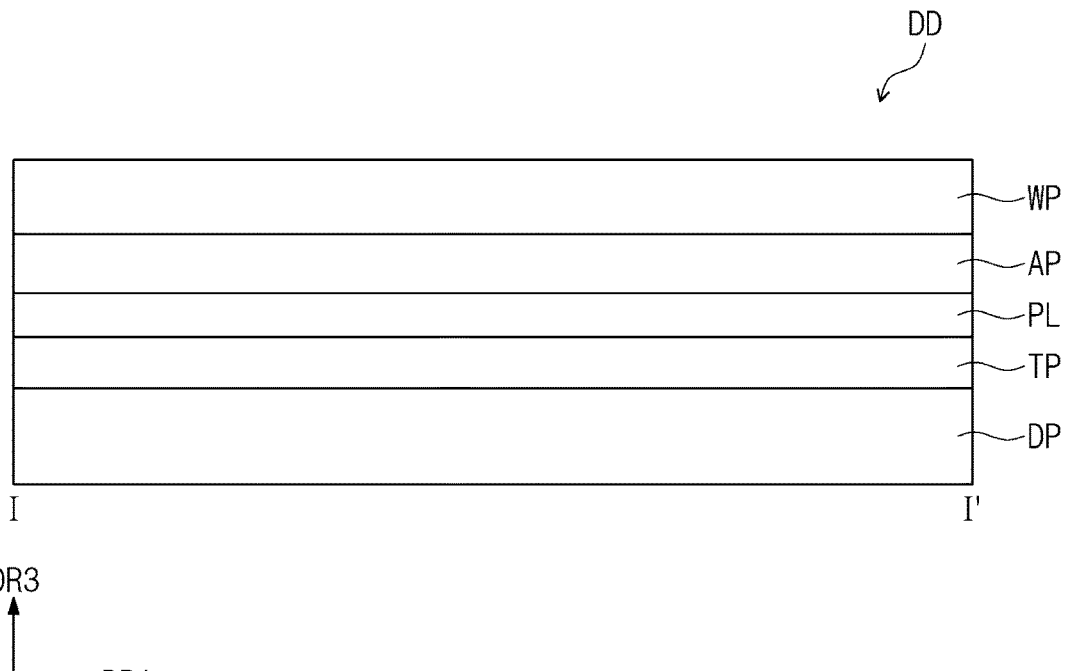
FIGS. 9A and 9B are cross-sectional views of a display device of an embodiment.
Figure 9B:
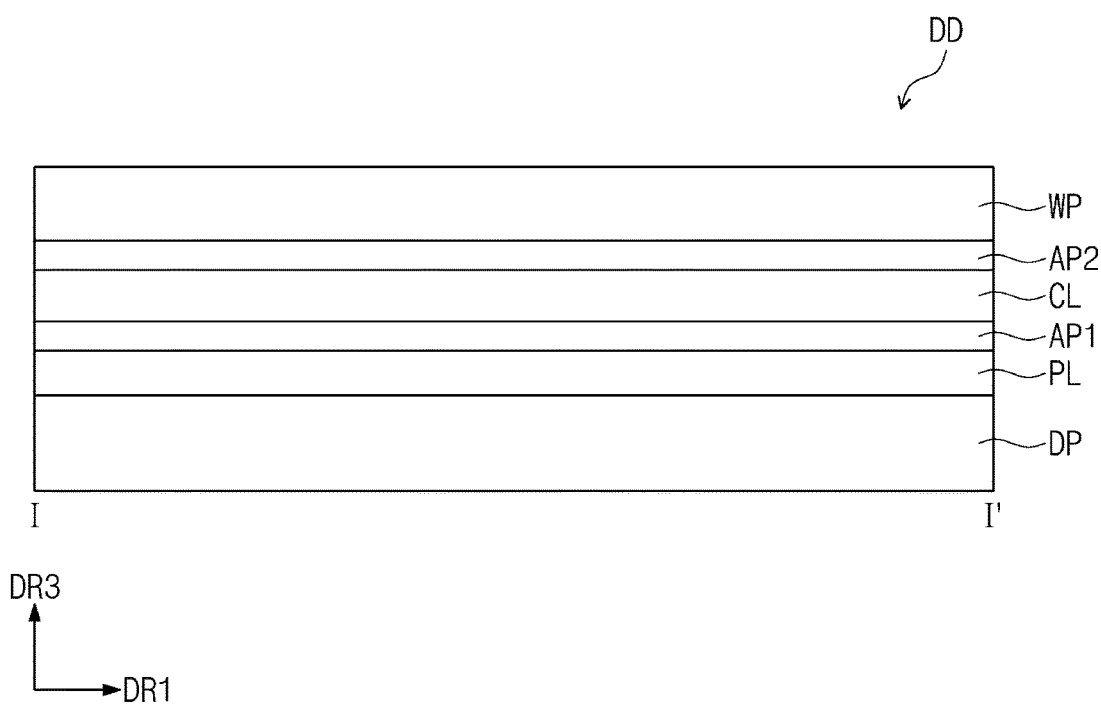

FIGS. 9A and 9B are views schematically illustrating cross sections of a display device DD. Hereinafter, the same descriptions as the one described with reference to FIGS. 1 to 8D may be applied, and the differences will be mainly described.

FIG. 9A illustrates a display device DD of an embodiment in which a touch sensing unit TP is on a polarizing layer PL. The touch sensing unit TP may be on the display panel DP. For example, the touch sensing unit TP may be directly on the encapsulation layer TFE (FIG. 7) of the display panel DP. The touch sensing unit TP may sense an external touch, change the touch to a set or predetermined input signal, and provide the input signal to the display panel DP. The touch sensing unit TP may recognize a user's direct touch, a user's indirect touch, a direct touch of an object, and/or an indirect touch of an object. In some embodiments, the touch sensing unit TP may sense at least any one selected from a location of a touch and an intensity (pressure) of a touch applied from the outside. The touch sensing unit TP in an embodiment of the present disclosure may have various suitable structures or may be formed of or include various suitable materials, and is not limited to any one embodiment. The touch sensing unit TP may include a plurality of sensing electrodes to sense an external touch. The sensing electrodes may sense an external input through a capacitive method. The display panel DP may receive an input signal from the touch sensing unit TP and generate an image corresponding to the input signal. In addition, the touch sensing unit TP may further include a sensing unit. The sensing unit may include a pressure sensor and/or a proximity sensor. The display device of FIG. 9A may further include an adhesive member AP on the polarizing layer PL and a window WP on the adhesive member AP.

FIG. 9B illustrates a display device DD including a plurality of adhesive members AP1 and AP2 and a core layer CL between the plurality of adhesive members AP1 and AP2. The core layer CL may be a layer having a higher modulus (e.g., a higher modulus of elasticity) than the plurality of adhesive members AP1 and AP2. For example, the core layer CL may include a plurality of transparent flexible polymer films. For example, the core layer CL may include a polyimide, polyacrylate, polymethylmethacrylate, polycarbonate, polyethylenenaphthalate, polyvinylidene chloride, polyvinylidene difluoride, polystyrene, ethylene vinylalcohol copolymer, triacetyl cellulose, a cyclo-olefin polymer, or a combination thereof. The core layer CL may be between the adhesive members AP1 and AP2 to increase flexibility, thereby improving flexibility in a bending and/or folding condition of the display device.

At least one selected from the plurality of adhesive members AP1 and AP2 may have the same description as the one on the adhesive member AP described above except for the description on thickness. For example, the second adhesive member AP2 in contact (e.g., physical contact) with the window WP may have the same description as the one on the adhesive member AP described above. In this case, the first adhesive member AP1 may not absorb 90% or greater of light having a wavelength in a range of about 300 nm to about 380 nm. However, embodiments of the present disclosure are not limited thereto, and each of the plurality of adhesive members AP1 and AP2 may have the same description as the one on the adhesive member AP described above. When the core layer CL is included between the plurality of adhesive members AP1 and AP2, each of the plurality of adhesive members AP1 and AP2 may have a thickness in a range of about 20 µm to about 100 µm. The display device of FIG. 9B further includes a display panel DP and a polarizing layer PL as described above.

Figure 10:
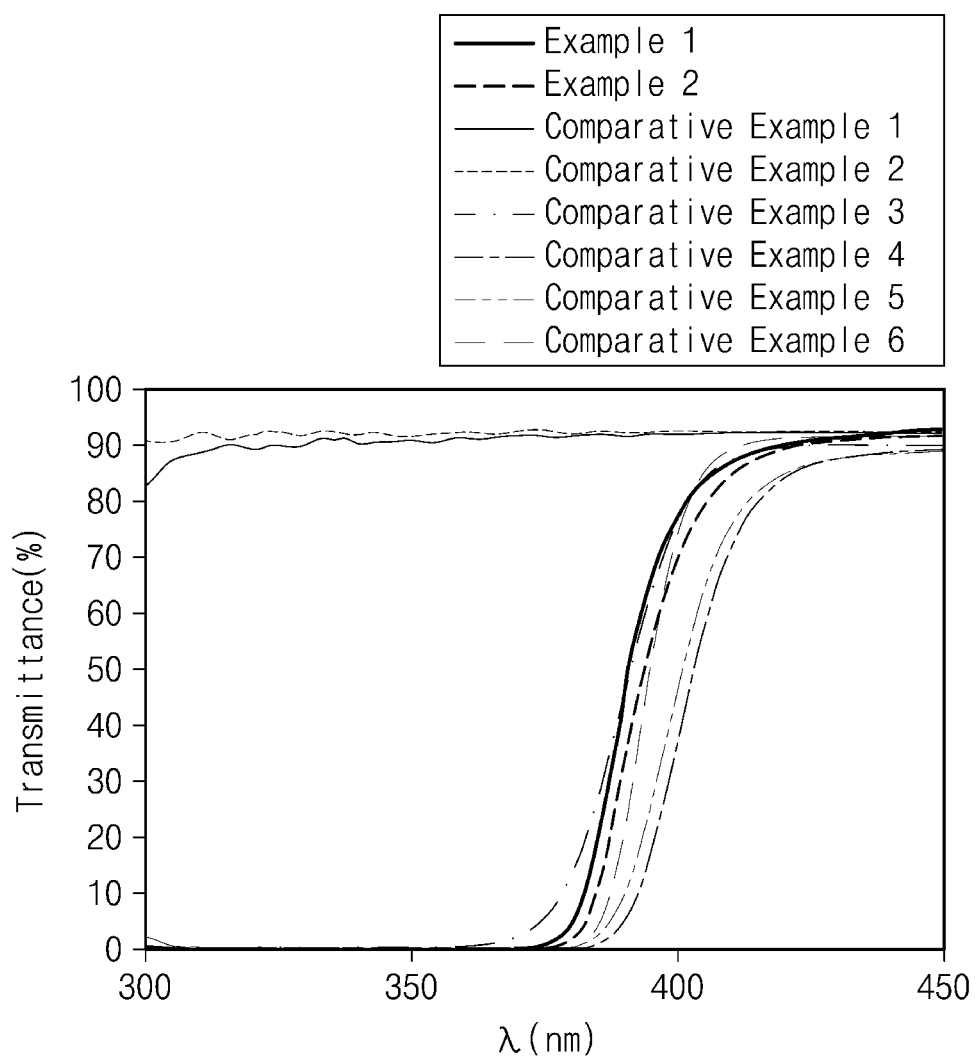
FIG. 10 is a graph showing transmittance of adhesive members of Examples and Comparative Examples.
Figure 11A:
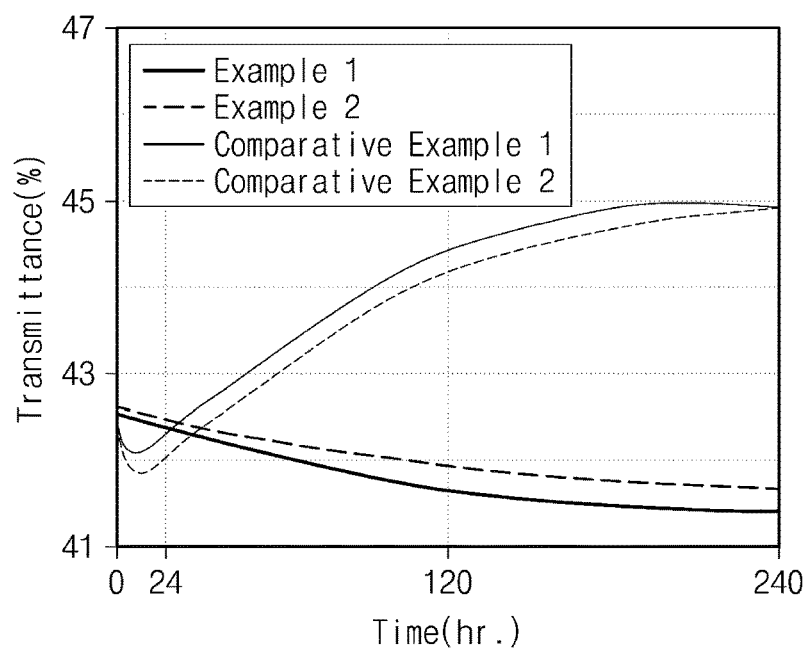
FIG. 11A is a graph showing transmittance of display devices of an Examples and Comparative Examples.
Figure 11B:
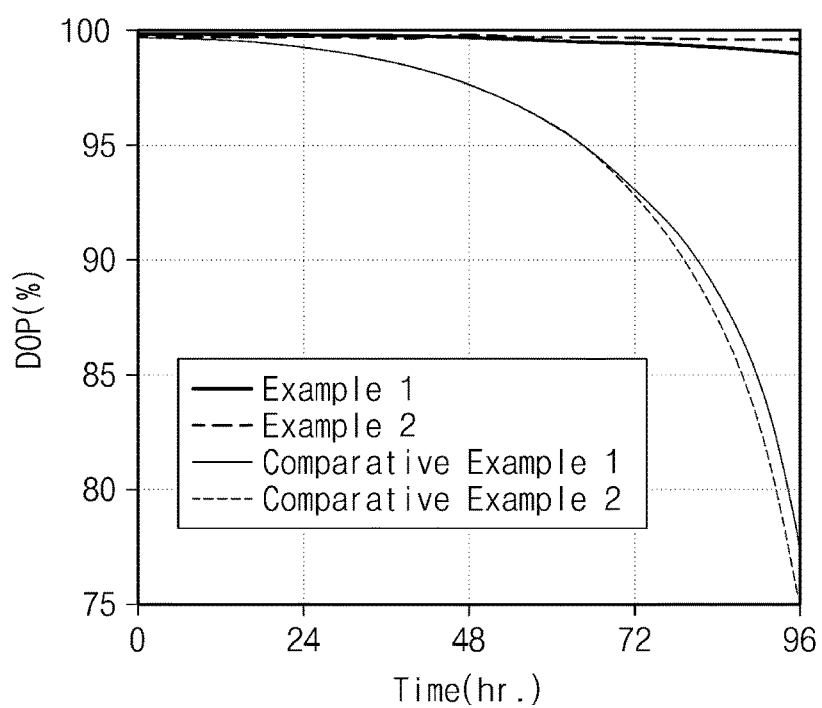
FIG. 11B is a graph showing the degree of polarization of display devices of Examples and Comparative Examples.

FIG. 10 is a graph showing transmittance of adhesive members of Examples and protective layers of Comparative Examples. FIG. 11A is a graph showing transmittance of display devices of Examples and Comparative Examples. FIG. 11B is a graph showing the degree of polarization of display devices of Examples and Comparative Examples.

In FIG. 10, Example 1 is an adhesive member including an oxybenzophenone-based compound as an ultraviolet absorber and having a thickness of about 100 µm. Example 2 is an adhesive member including a benzotriazole-based compound as an ultraviolet absorber and having a thickness of about 200 µm. Comparative Example 1 is substantially the same adhesive member as Example 1, except that an ultraviolet absorber is not included. Comparative Example 2 is substantially the same adhesive member as Example 2, except that an ultraviolet absorber is not included. Comparative Examples 3 to 6 may be protective layers of generally used linear polarizers. For example, Comparative Example 3 is a 30 µm-thick tri-acetyl cellulose (TAC) film, Comparative Example 4 is a 27 µm-thick cyclo-olefin polymer (COP) film, Comparative Example 5 is a 19 µm-thick COP film, and Comparative Example 6 is a 29 µm-thick COP film. The transmittances of Examples 1 and 2 indicate that 90% or greater of light having a wavelength of about 380 nm or less is absorbed. For example, when compared to the adhesive members of Comparative Examples 1 and 2, it can be seen that Examples 1 and 2 have excellent ultraviolet absorption properties. In addition, when compared to Comparative Examples 3 to 6, it can be seen that Examples 1 and 2 have equal or superior ultraviolet absorption properties. Accordingly, the display device of an embodiment includes the adhesive member according to an embodiment, may thus have equal or superior ultraviolet blocking properties even without a protective layer.

In FIGS. 11A and 11B, Example 1 is a display device including the adhesive member of Example 1 of FIG. 10, and Example 2 is a display device including the adhesive member of Example 2 of FIG. 10. Comparative Example 1 is a display device including the adhesive member of Comparative Example 1 of FIG. 10, and Comparative Example 2 is a display device including the adhesive member of Comparative Example 2 of FIG. 10. The display devices of the Examples and the Comparative Examples have an identical configuration except for the adhesive member, and have the configuration of the display device of FIG. 7. In FIG. 11A, the x-axis refers to time exposed to ultraviolet light, and the y-axis refers to transmittance measured at about 380 nm to about 780 nm. In FIG. 11B, the x-axis refers to time exposed to ultraviolet light, and the y-axis refers to degree of polarization.

Referring to FIG. 11A, in Examples 1 and 2, when the time exposed to ultraviolet light increased, a sudden change in transmittance was not shown. Referring to FIG. 11B, it can be seen that an initial degree of polarization (DOP) was maintained when the time exposed to ultraviolet light increased, and a difference in degree of polarization (DOP) is less than about 2%. In Comparative Examples 1 and 2, when the time exposed to ultraviolet light increased, it is seen that the degree of polarization (DOP) sharply decreased, and Comparative Examples 1 and 2 have much lower degree of polarization (DOP) than the Examples. Accordingly, even when the display device of an embodiment is exposed to ultraviolet light for a long period of time, a polarizing layer may be protected from the ultraviolet light, thereby having excellent durability.

The display device of an embodiment includes an adhesive member that absorbs 90% or greater of light having a wavelength in a range of about 300 nm to about 380 nm, and may thus prevent the polarizing layer from being deteriorated due to ultraviolet light (or may reduce deterioration of the polarizing layer due to ultraviolet light) without including a separate protective member in the polarizing layer. In addition, a thinner display device may be obtained, and wrinkles or cracks in the polarizing layer may not be caused even in a bending and/or folding operation state to exhibit excellent operational reliability.

A display device of an embodiment includes a thinned polarizing member, and may thus exhibit excellent reliability in various suitable operation states.

A display device of an embodiment includes an adhesive member capable of preventing or reducing deterioration in optical properties, and may thus exhibit excellent durability.

Although the subject matter of the present disclosure has been described with reference to embodiments of the present disclosure, it will be understood that the subject matter of the present disclosure should not be limited to the disclosed embodiments but various changes and modifications can be made by those skilled in the art without departing from the spirit and scope of the present disclosure.

Accordingly, the technical scope of the present disclosure is not intended to be limited to the contents set forth in the detailed description of the specification, but is intended to be defined by the appended claims, and equivalents thereof.

What is claimed is:
1. A display device comprising:
a display panel;
a polarizing layer on the display panel and including a linear polarizer having a stretched polymer film;
an adhesive member directly on the linear polarizer; and
a window on the adhesive member,
wherein the adhesive member absorbs 90% or greater of light having a wavelength in a range of about 300 nm to about 380 nm,
wherein the adhesive member comprises:
a first adhesive layer on the polarizing layer;
a core layer directly on the first adhesive layer; and
a second adhesive layer directly on the core layer,
at least one selected from the first adhesive layer and the second adhesive layer absorbing 90% or greater of light having a wavelength in a range of about 300 nm to about 380 nm,
wherein the core layer has a higher modulus than a modulus of the first adhesive layer and a modulus of the second adhesive layer, and
wherein the core layer consists of a plurality of transparent flexible polymer films.

2. The display device of claim 1, wherein the adhesive member comprises an elastomer adhesive resin and an ultraviolet absorber.

3. The display device of claim 2, wherein the ultraviolet absorber comprises at least one selected from among a benzotriazole-based monomer, a triphenyltriazine-based monomer, and a benzophenone-based monomer.

4. The display device of claim 2, wherein the ultraviolet absorber is contained in an amount in a range of about 0.5 to about 10 parts by weight with respect to the total parts by weight.

5. The display device of claim 2, wherein the adhesive member further comprises an ultraviolet active crosslinking agent.

6. The display device of claim 1, wherein the adhesive member has a peel force in a range of about 2000 g/25 nm to about 5000 g/25 nm,
the peel force being measured in accordance with KS A 1107.

7. The display device of claim 1, wherein the adhesive member has a thickness in a range of about 50 μm to about 200 μm.

8. The display device of claim 1, wherein the polarizing layer further comprises:
a phase retardation layer on the display panel; and
an optical adhesive layer between the phase retardation layer and the linear polarizer.

9. The display device of claim 1, wherein the polarizing layer further comprises:
a first phase retardation layer on the display panel; and
a second phase retardation layer on the first phase retardation layer,
the first phase retardation layer is a λ/4 phase retardation layer, and the second phase retardation layer is a λ/2 phase retardation layer.

10. The display device of claim 1, wherein the first adhesive layer is in contact with the window, and
the first adhesive layer absorbs 90% or greater of light having a wavelength in a range of about 300 nm to about 380 nm.

11. The display device of claim 1, further comprising a touch sensing unit between the display panel and the polarizing layer.

12. The display device of claim 11, wherein the display panel comprises a display element layer and an encapsulation layer on the display element layer,
the touch sensing unit being directly on the encapsulation layer.

13. The display device of claim 1, wherein the display device comprises at least one folding region,
the folding region having a radius of curvature of about 5 mm or less.

14. The display device of claim 1, wherein the plurality of transparent flexible polymer films comprise polyimide, polyacrylate, polymethylmethacrylate, polycarbonate, polyethylenenaphthalate, polyvinylidene chloride, polyvinylidene difluoride, polystyrene, ethylene vinylalcohol copolymer, triacetyl cellulose, a cyclo-olefin polymer, or a combination thereof.

15. A flexible display device comprising:
a display panel including a bending region deformable into a bent shape or having a bent shape, with respect to a bending axis extending in one direction;
a polarizing layer on the display panel and including a linear polarizer having a stretched polymer film;
an adhesive member directly on the linear polarizer; and
a window on the adhesive member,
wherein the adhesive member absorbs 90% or greater of light having a wavelength in a range of about 300 nm to about 380 nm,
wherein the adhesive member comprises:
a first adhesive layer on the polarizing layer;
a core layer directly on the first adhesive layer; and
a second adhesive layer directly on the core layer,
at least one selected from the first adhesive layer and the second adhesive layer absorbing 90% or greater of light having a wavelength in a range of about 300 nm to about 380 nm,
wherein the core layer has a higher modulus than a modulus of the first adhesive layer and a modulus of the second adhesive layer, and
wherein the core layer consists of a plurality of transparent flexible polymer films.

16. The flexible display device of claim 15, the adhesive member has a peel force in a range of about 2000 g/25 nm to about 5000 g/25 nm, the peel force being measured in accordance with KS A 1107.

17. The flexible display device of claim 15, wherein the polarizing layer further comprises:
a phase retardation layer on the display panel; and
an optical adhesive layer between the phase retardation layer and the linear polarizer.

18. A display device comprising:
a display panel;
a polarizing layer on the display panel and including a linear polarizer having a stretched polymer film;
a first adhesive layer directly on the linear polarizer;
a core layer directly on the first adhesive layer;
a second adhesive layer directly on the core layer; and
a window on the second adhesive layer,
wherein the core layer has a higher modulus than a modulus of the first adhesive layer and a modulus of the second adhesive layer, and
wherein the core layer consists of a plurality of transparent flexible polymer films.

19. The display device of claim 18, wherein at least any one selected from the first adhesive layer and the second adhesive layer absorbs 90% or greater of light having a wavelength in a range of about 300 nm to about 380 nm.

20. The display device of claim 18, wherein the first adhesive layer and the second adhesive layer each has a thickness in a range of about 20 μm to about 100 μm.

* * * * *